United States Patent [19]

Crow et al.

[11] 4,284,864

[45] Aug. 18, 1981

[54] LOW ACTUATING FORCE SWITCH

[75] Inventors: William D. Crow; John G. Lewis, both of St. Louis, Mo.

[73] Assignee: Emerson Electric Co., St. Louis, Mo.

[21] Appl. No.: 6,570

[22] Filed: Jan. 26, 1979

[51] Int. Cl.[3] .......... H01H 3/00; H01H 35/10; H02P 1/42; H02K 11/00

[52] U.S. Cl. .......... 200/153 V; 318/793; 200/80 R; 310/68 E

[58] Field of Search .......... 200/80 R, 61.45 R, 159 A, 200/153 V, 67 A, 67 D, 67 DA, 6 BB, 6 C, 7, 340; 318/793, 789, 790; 310/68 E

[56] References Cited

U.S. PATENT DOCUMENTS

| | | | |
|---|---|---|---|
| 3,485,975 | 12/1969 | Long | 200/153 V |
| 3,586,810 | 6/1971 | Brown | 200/168 G |
| 3,790,730 | 2/1974 | Wyland | 200/153 V |

*Primary Examiner*—J. V. Truhe
*Assistant Examiner*—John B. Conklin
*Attorney, Agent, or Firm*—Polster, Polster and Lucchesi

[57] ABSTRACT

A low actuating force switch having one or more resilient switch arms cantilevered within a switch housing and further having an operating member or plunger movable within the housing for flexing the switch arm(s) and for making or breaking one or more circuits. A spring is interposed between the operating member and one of the switch arms for applying a force to this switch arm which in turn flexes the latter. In instances in which the switch arm is normally in an unflexed, open position and in which the operating member continues to move in the direction for closing the contacts after the contacts have closed, the spring takes up or absorbs a substantial portion of the additional movement of the operating member without exerting undue stress on the switch arm. In instances in which the switch contacts are normally closed, the operating member may engage the switch arm distal from its cantilevered connection to the switch housing so as to lessen the force required to open the contacts.

7 Claims, 9 Drawing Figures

RUN POSITION

OFF POSITION

LOW ACTUATING FORCE SWITCH

BACKGROUND OF THE INVENTION

This invention relates to a low actuating force switch, and more particularly to a low actuating force motor starting switch in which the deflection of one or more of the switch arms in the switch is limited so as to reduce the stresses applied to the switch arms.

Conventionally, an electric motor, such as a split phase or a capacitor start motor, includes an auxiliary starting winding in the stator assembly of the motor which is energized only during start up of the motor so as to provide sufficient start up torque for the motor. Once the motor has accelerated to a predetermined operating speed (e.g., 80 percent of its synchronous speed) the main windings of the stator assembly will produce sufficient torque to operate the motor. As is conventional, the motor includes a centrifugal actuator responsive to the motor speed and a switch, referred to as a motor starting switch, actuable by the centrifugal actuating member for deenergizing the starting winding once the motor has attained its predetermined operating speed. Upon slowing or stopping of the motor, the centrifugal actuator effects the closing of the motor starting switch so that upon reenergization of the motor, the starting winding will again be energized.

As is typical, a motor starting switch may have a fixed contact, a movable cantilevered switch arm, and a movable contact carried by the switch arm. The switch arm is cantilevered supported at one end by the switch housing and is flexibly, resiliently movable (i.e., bendable) by a switch operating member or plunger which is in turn moved along a path within the switch housing by the centrifugal actuator. The plunger is typically moved through a distance somewhat greater than is required to close the switch contacts upon the centrifugal actuator moving from its run to its off or stopped position. It is, in many cases, necessary that the actual stroke of the centrifugal actuator as it moves between its run and off position be greater than the minimum stroke required to close the contacts so that the relative position of the motor starting switch and the centrifugal actuator are not so critical. By having the stroke of the centrifugal actuator greater than is required, the operation of the motor starting switch is less sensitive to its position relative to the centrifugal actuator and thus the switch can accommodate a greater degree of end play of the rotor assembly in the bearings of the motor and of mispositioning of the switch relative to the centrifugal actuator.

Oftentimes the centrifugal actuator is capable of applying forces to the switch arm via the plunger far in excess of the force needed to close the contacts and to maintain good electrical contact therebetween. Because the plunger may be moved through a distance greater than is required to close the contacts and because it may exert relatively high force on the switch arm, the switch arm is in many cases (depending on the relative adjustment of the motor starting switch in the centrifugal actuator) subjected to high bending stresses when it is in its closed position upon each cycle of the motor starting switch as the centrifugal actuator moves from its run to its off position. Thus, the switch arms of certain prior art motor starting switches have, on occasion, failed due to fatigue. Of course, such a failure of the switch arm of a motor starting switch would prevent the motor from starting.

In certain instances, motor starting switches include other contacts operable by the centrifugal actuator for opening and closing other circuits upon start up and shut down of the motor. For example, the starting switch for the drive motor of an electric clothes dryer may include a set of contacts which open upon stopping of the motor so as to disconnect the dryer's heating elements from the power input lines to the dryer when the dryer is off. However, these additional sets of contacts require that the centrifugal actuator apply a considerable force above and beyond the force necessary to operate only the switch arm and contacts controlling the starting winding of the motor. If the force required to operate the various sets of contacts in the motor starting switch exceeds the force applied to the operating member by the centrifugal actuator, the contacts will not be properly opened and the motor and other elements of the appliance will fail to operate. This condition is sometimes referred to as a "stuck actuator" malfunction. Many prior art motor starting switches had relatively high actuation forces thus making operation of the centrifugal actuator even more critical.

SUMMARY OF THE INVENTION

Among the several objects and features of this invention may be noted the provision of a motor starting switch which requires a relatively low force to open and to close the contacts therein and to maintain a good electrical contact between the contacts when closed;

The provision of such a motor starting switch which permits the centrifugal actuator of the motor readily to move through its full stroke without applying excessive stress to the switch arm of a normally closed switch when the latter is closed;

The provision of such a motor starting switch which requires relatively low force to open the normally closed contacts therein; and The provision of such a motor starting switch which is low in cost, which is compact in size, which is easy to manufacture with already existing equipment, which has a long service life, which can be used in existing motors without modification of the motor, and which is safe and reliable in operation.

Briefly, a motor starting switch of this invention comprises a housing, a switch in the housing including a fixed contact and a movable contact for making and breaking a circuit which may, for example, include the auxiliary starting winding of an electric motor, and a switch operating member for being operated by a centrifugal actuator or the like so as to open the contacts upon start up of the motor and upon the motor attaining a predetermined operational speed so as to close the contacts upon shut down of the motor. The switch further includes a flexible, resilient switch arm of suitable electrical conducting material cantilever supported relative to the housing, the movable contact being carried by this switch arm. The switch arm is flexibly movable from a normally open position in which the fixed and movable contacts are clear of one another and a closed position in which the contacts make electrical contact therebetween thus connecting the starting winding of the motor to a circuit for energization of the starting winding. The switch operating member is movable by the centrifugal actuator through a stroke along a path within the housing between an off position when the motor is stopped in which the switch contacts are closed and a run position when the motor is operating at a speed equal to or greater than its predetermined operational speed in which the switch contacts are open. The switch operating member is engageable with the switch arm upon movement of the switch operating member between its run and off positions for closing the switch. The stroke of the switch operating member is greater than the distance the switch arm must be moved at the point of contact by the switch operating member so as to effect closing of the switch. The switch operating member has a spring or other resilient means interposed between the switch operating member and the switch arm for transmitting movement of the centrifugal actuator to the switch arm for closing the switch and for substantially taking up the remainder of the stroke of the switch operating member greater than the movement of the switch operating member required to close the switch without substantially subjecting the switch arm to undue bending.

Other objects and features of this invention will be in part apparent and in part pointed out hereinafter.

BRIEF DESCRIPTION OF THE DRAWINGS

Corresponding reference characters indicate corresponding parts throughout the several views of the drawings.

DESCRIPTION OF PREFERRED EMBODIMENTS

Figure 1:
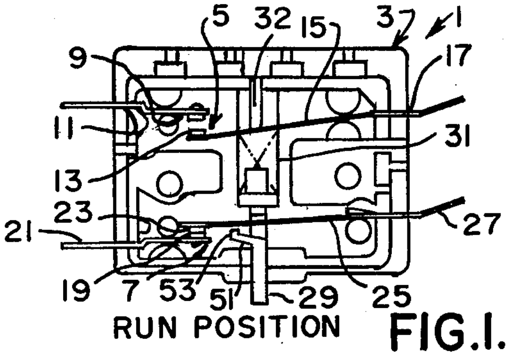
FIG. 1 is a vertical cross sectional view of a motor starting switch of the present invention in its "run position" with a first set of contacts (the upper contacts) shown in an open position for deenergizing the starting winding (not shown) of a motor, and with a second set of contacts normally closed.

Referring now the drawings, a motor starting switch of this invention is indicated in its entirety at 1 and is shown to comprise a housing 3 of suitable synthetic resin material, such as bakelite or the like, which is a good electrical insulator. As generally indicated at 5 and 7, two switch contact sets are provided. Contact set 5 includes a fixed contact 9 carried on a rigid terminal 11 held fixedly in place within switch housing 3 and a movable contact 13 carried by a cantilevered, flexible, resilient switch arm 15. The latter is cantilever secured to a fixed terminal 17 rigidly supported within housing 3. Contact set 7 includes a fixed contact 19 carried by a fixed terminal 21 held in place in housing 3 and a movable contact 23 carried by a cantilevered, flexible, resilient switch arm 25. The latter is fixedly secured to a terminal 27 rigidly held in place within the housing. Switch arms 15 and 25 are current carrying members and may, for example, be made of a suitable brass or copper alloy. Terminals 11, 17, 21 and 27 extend outwardly from housing for connection to their respective electrical leads (not shown) for electrical connection of the starting switch to the motor and to the controls for the motor.

Starting switch 1 further includes an operating member or plunger 29 which extends outwardly from housing 3 for operative engagement by a centrifugal actuator or governor (not shown) on the motor in which switch 1 is adapted to be installed. As will be appreciated, the centrifugal actuator may be any conventional centrifugal actuator such as that shown in the co-assigned U.S. Pat. No. 3,609,421 and may be operatively connected to the starting switch directly or by any of several well known linkage arrangements. Generally, a centrifugal actuator is mounted on the rotor shaft of a motor for rotation therewith and it typically has an actuator member movable axially relative to the rotor shaft upon start up and shut down of the motor. For example, the actuator member may be movable through a stroke of about 0.3 inches (7.6 mm.) between an off or stop position when the motor is stopped and a run position when the motor is operating at a predetermined operating speed. It should be noted, however, that the linkage operatively interconnecting the actuator member of the centrifugal actuator and plunger 29 may be such that the plunger is movable relative to the housing through a distance or stroke S (see FIG. 3C) somewhat less than the stroke of the centrifugal actuator.

Figure 2:
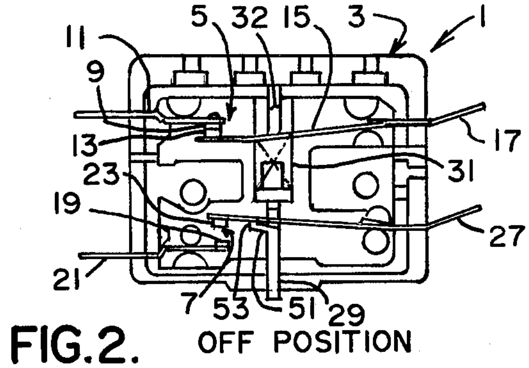
FIG. 2 is view of the motor starting switch similar to FIG. 1 illustrating the switch in its "off position" showing the first set of contacts closed and the second set of contacts open.

Plunger 29 is movable relative to housing 3 from a run position (see FIGS. 1 and 3A) in which it extends outwardly from the housing a maximum distance when the centrifugal actuator is in its run position to an off or stop position (FIGS. 2 and 3C) upon slowing or stopping the motor and upon movement of the centrifugal actuator from its run to its off position. As shown, plunger 29 is biased toward its run position by switch arms 15 and 25 and by a compression coil spring 31. It will be particularly noted that the above-mentioned compression coil spring (also referred to as resilient means) is interposed between plunger 29 and switch arm 15 for purposes as will appear in accordance with this invention. The plunger extends through an opening in the bottom of housing 3 and rides in a slot or groove 32 formed in the interior of the housing. Switch arms 15 and 25 are so constructed that each tends to assume a normal or unflexed position in which it is substantially coplanar with a plane tangent to the outer surface of the switch arm at its point of attachment to its respective terminal 17 or 27. Switch arm 15 is shown substantially in its unflexed positions in FIGS. 1 and 3A. When plunger 29 is in its run position, switch arm 25 is prevented from fully returning to its unflexed position due to engagement of its movable contact 23 with fixed contact 19. The resiliently flexed switch arm 25 thus exerts sufficient force between its contacts so as to make good electrical contact therebetween. As plunger 29 is moved toward its off position, both switch arms 13 and 25 are flexed farther away from their respective unflexed positions and thus exert a biasing force on plunger 29 tending to bias the plunger toward its run position.

Figure 3A:
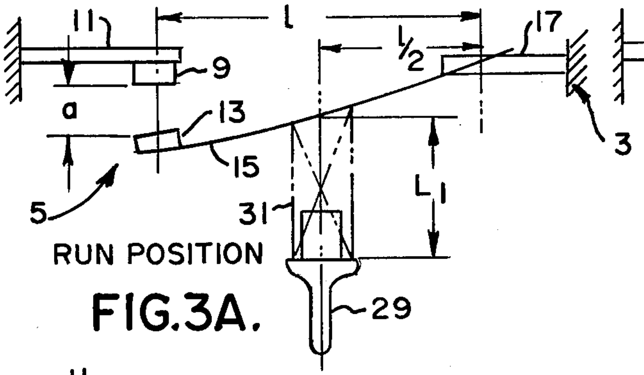
FIGS. 3A–3C illustrate a switch operating member or plunger movable within the switch and further illustrate the various relative positions of the first set of contacts and the switch operating plunger as the plunger is moved from its run to its off position.
Figure 3B:
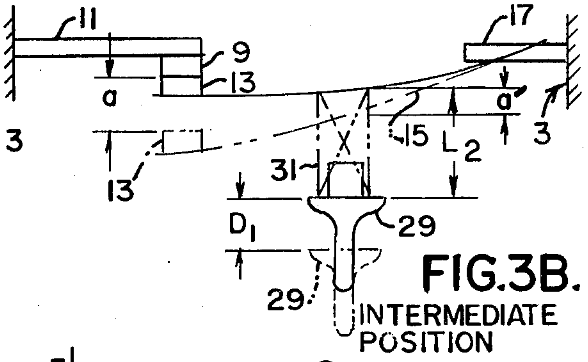
Figure 3C:
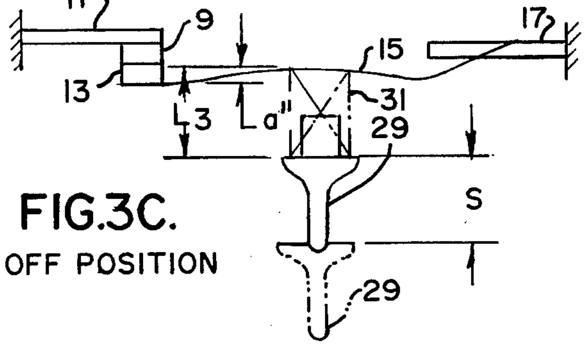

Referring now to FIGS. 3A–3C, contact set 5 and a portion of plunger 29 carrying spring 31 are shown in greater detail. In FIG. 3A, plunger 29 is shown in its run position in which it extends out of housing 3 its maximum distance (see FIG. 1), in which switch arm 15 is in (or is nearly in) its unflexed position, and in which coil spring 31 is substantially fully extended (i.e., substantially in its free position). In accordance with this invention, spring 31 has a spring constant K and the force exerted by spring 31 on switch arm 15 at the point of engagement between the switch arm and the spring and the force exerted on the plunger may be calculated from the following equation: $F_1=K\times\Delta L$ where $F_1$ equals force in pounds (or kg), K equals pounds/inch (or kg/cm), and $\Delta L$ equals the deflection of the spring deflection in inches (or cm). It will be noted that the free end of spring 31 is shown to engage switch arm 15 midway between its cantilever connection to terminal 17 in its free end carrying movable contact 13 and that the length of switch arm 15 is indicated by 1. It will be understood, however, that spring 31 may engage switch arm 15 in any point therealong.

As plunger 29 is moved inwardly through distance $D_1$ (see FIG. 3B) into housing 3 from its run position (as shown in FIG. 3A) to an intermediate position (as shown in FIG. 3B), contact 13 is moved through a distance a (see FIG. 3A) to close contacts 9 and 13 and to make an electrical circuit therebetween. Since spring 31 bears against switch arm 15, it exerts a force on the switch arm sufficient to deflect the mid-point of the switch arm 15 through a distance a' (see FIG. 3B) sufficient to cause contact 13 on the free end of the switch arm to move through the above-noted distance a and to engage contact 9. Further, the force exerted on spring 31 by switch arm 15 will cause the spring to compress. Thus, it will be noted that the distance $D_1$ which plunger 29 moves through from its run position to the intermediate position is equal to the distance that the midpoint of switch arm 15 is deflected plus the compression of spring 31. That is, $D_1=a'+\Delta L=a'+(L_1-L_2)$.

As mentioned above, switch arms 15 and 25 are made of a resilient, flexible, electrical conductor, such as a suitable copper or brass alloy. By way of example, the alloy may be a commercial alloy available under the tradename of Olin 638 from the Olin Corporation of Stamford, Connecticut. This alloy has a modulus of elasticity (E) of about $1.67\times10^7$ psi and is a relatively good spring material. Further, for purposes of illustration, it will be assumed that the length l of switch arm 15 is 1.00 inch (2.54 cm) and that it has a rectangular moment of inertia (I) of $0.208\times10^{-7}$ in. 4. Also, the spring constant K of spring 31 has a value of about 10.3 pounds/inch, and the distance a through which contact 13 must be moved to engage contact 9 is 0.145 in. (3.7 mm.).

As mentioned above, spring 31 exerts a force $F_1$ on switch arm 15 of sufficient magnitude as to cause the mid-point of switch arm to flex through distance a' thereby to move movable contact 13 through distance a into engagement with contact 9. This force $F_1$ also causes spring 31 to compress to its intermediate length $L_2$, as shown in FIG. 3B. Thus, this force $F_1$, distance a' and a first spring constant or coefficient of stiffness $Q_1$ for switch arm 15 as it is flexed from its run (or unflexed) position to its intermediate (or initally closed position) may be calculated from the following equations:

$$a=\frac{F_1\left(\frac{l}{2}\right)^2}{6EI}\left(3l-\frac{l}{2}\right)=F_1\frac{5l^3}{48EI} \quad \text{(Eqn. 1.1)}$$

By substituting the above-identified values in equation 1.1 for a and l, $F_1$ is found to be about 0.48 pounds (0.22 kg.).

Further, $$a'=\frac{F_1\left(\frac{l}{2}\right)^2}{6EI}\left(\frac{3l}{2}-\frac{l}{2}\right)=\frac{F_1l^3}{24EI} \quad \text{(Eqn. 1.2)}$$

By substituting values into equation 1.2, a' is found to be equal to 0.0579 in. (1.47 mm.). Also, by re-arranging equation 1.2, it is seen that $$F_1=(24EI/l^3)a' \quad \text{(Eqn. 1.3)}$$

and that $$Q_1=24EI/l^3 \quad \text{(Eqn. 1.4)}$$

By substituting values into equation 1.4, $Q_1=8.336$ pounds/inch.

Switch arm 15 is shown to undergo further deflection from its intermediate position (FIG. 3B) to a final deflected position or off position (FIG. 3C) as plunger 29 is moved fully through its stroke S into switch body 3 by the centrifugal actuator. As the switch undergoes this additional deflection due to the plunger moving through the remainder of its stroke, swith arm 15 is now seen to be cantilevered at one end, simply supported at the other, and loaded by spring 31 at its middle. In this newly supported position, the spring constant of switch arm 15 increases dramatically and the switch arm becomes much stiffer and greatly resists further deflection by movement of plunger 29. The calculation of this second spring constant or coefficient of stiffness $Q_2$ for switch arm 15 now follows.

The force, as now indicated by $F_2$, applied to spring 31 and to switch arm 15 are equal. The distance the midpoint of switch arm 15 is deflected, as indicated by a'' in FIG. 3C, may be calculated from the following equation:

$$a'=F_2/96EI[5(l/2)^3-3l(l/2)] \quad \text{(Eqn. 1.5)}$$

By substituting known values into equation 1.5 and by rearranging the equation, we see that $$F_2=EI/0.0091a'' \quad \text{(Eqn. 1.6)}$$

and that $$Q_2=EI/0.0091=38.2 \text{ pounds/inch} \quad \text{(Eqn. 1.7)}$$

Thus, it is seen that the spring constant of spring 31, as indicated by K and which was heretofore assigned a value of 10.3 lbs. pounds/inch, is greater than the first spring constant $Q_1$ of switch arm 15 (heretofore calculated to be 8.3 pounds/inch) as the switch arm moves from its unflexed or open position (see FIG. 3A) to make contact between contacts 9 and 13 and is substantially less than spring constant $Q_2$ of switch arm 15

(heretofore calculated to be 38.2 pounds/inch) as the latter is further flexed upon continued movement of plunger 29 inwardly once contacts 9 and 13 have closed. Since spring 31 is stiffer than switch arm 15 as the switch arm is flexed from its open position to its closed position, the majority of movement of plunger 29 will be taken up by the flexing of the switch arm. As noted above, the spring constant K of switch 31 equals about 10.3 pounds/inch and the first spring constant $Q_1$ of switch arm 15 equals about 8.3 pounds/inch. Thus, switch arm 15 will initially deflect about 1.2 times as much as spring 31. However, upon further flexing of switch arm 15 from its make or intermediate position (as shown in FIG. 3B) to the full stroke position of plunger 29 when in its off position (see FIG. 3C), the spring constant $Q_2$ of switch arm 15 is appreciably greater than the spring constant K of spring 31. Thus, spring 31 will compress much more readily than the switch arm and the spring will absorb or take up the majority of the additional travel of the plunger. In this example, with spring constant K of spring 31=10.3 pounds/inch and spring constant $Q_2$ of switch arm 15=38.2 pounds/inch, spring 31 will deflect about 3.1 times as much as spring arm 15 after contact 13 makes with fixed contact 9 and upon further movement of plunger 29 toward its off position.

It is thus seen that spring 31 serves to absorb the majority of additional travel plunger 29 after contacts 9 and 13 have closed and further serves to limit the force and hence the stress applied to the switch arm. It will be appreciated that if spring 31 were not interposed between switch arm 15 and plunger 29 and if plunger 29 were fully moved through the remainder of its stroke S after the contacts had closed, the switch arm would be flexed the full amount of the remainder of the plunger stroke. However, because spring 31 absorbs or takes up the majority (in the illustrated example, about 72.3%) of the additional travel of the plunger, the deflection of the switch arm 15 is limited and the stresses therein are appreciably lower. This in turn increases substantially the fatigue life of switch arm 15 and makes it much less subject to failure upon repeated cycling. In short, the service life of switch 1 is appreciably increased.

As heretofore noted, spring 31 has been defined as a compression coil spring interposed between plunger 31 and switch arm 15. It will be understood, however, that other types of resilient springs including tension coil springs may be interposed between the plunger and the switch arm so as to function in accordance with this invention.

It will, of course, be appreciated by those skilled in the art that the above example merely illustrates the principles of this invention and that the spring constants, dimensions, and mechanical properties of switch arm 15 and spring 31 may vary considerably. Also, it will be understood that switch arm 15 need not be contacted by spring 31 at its midpoint.

Figure 4A:
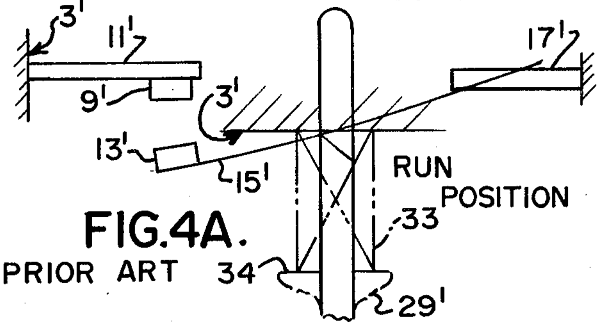
FIGS. 4A–4C illustrate the various relative positions of the contacts and the operating plunger of a typical prior art motor starting switch as the plunger moves from its run to its off position.
Figure 4B:
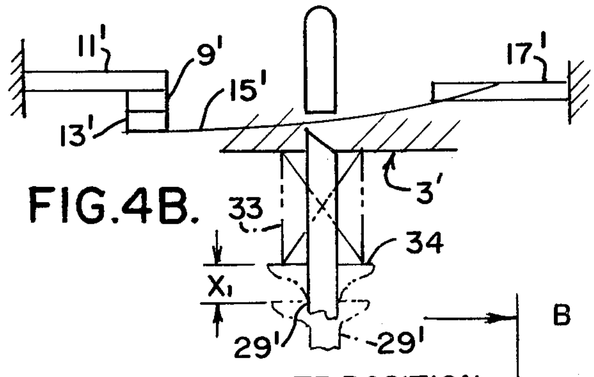
Figure 4C:
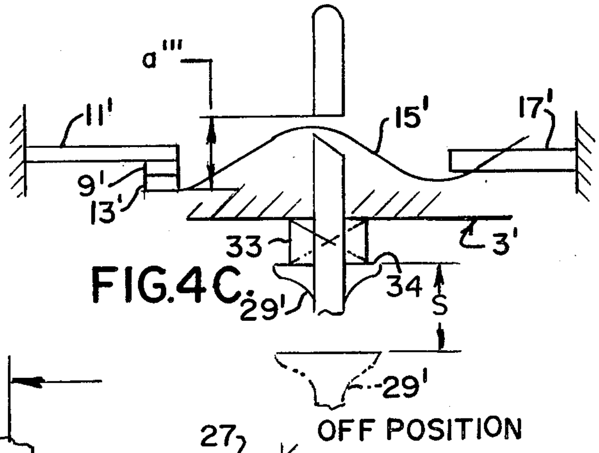

In FIGS. 4A–4C, a typical prior art plunger and contact set is shown for making electrical contact between a movable contact carried on the free end of the cantilevered switch arm and a fixed contact. Primed references characters in FIGS. 4A–4C indicate parts having similar functions to the parts heretofore described regard to in FIGS. 1–3C. In sharp contact to plunger 29 of switch 1, however, plunger 29' is biased by a compression coil spring 33 toward its run position (FIG. 4A). Spring 33 is interposed between a rigid shoulder 34 on plunger 29' and a stationary portion of housing 3'. In this prior art plunger arrangement, the plunger must exert a force equal to (actually somewhat greater than) the force required to compress spring 33 through the distance $X_1$ (see FIG. 4B) plus the force (i.e., force $F_1$) required to flex the cantilevered switch arm 15' from its open position (FIG. 4A) to its closed position (FIG. 4B). It will be noted that the distance $X_1$ is equal to the distance a' through the midpoint of both switch arms 15 and 15' must be deflected to close contacts 9 and 13 or 9' and 13'. In sharp contrast, the force required to close switch arm 15 of switch 1 of the present invention was only the force $F_1$ required to flex the switch arm. While spring 31 in switch 1 of the present invention is somewhat compressed during the closing of contact set 5, the force exerted compressing the spring was not additive to the force required to flex switch arm 15. Thus, is can be readily seen that the force required to initially close contact set 5 of switch 1 is less than the comparable prior art switch as herein shown if the spring constant of spring 33 is the same as spring constant K for spring 31.

Also, as the centrifugal actuator of the motor continues toward its off or stop position after the initial closing of contacts 9' and 13', both spring 33 and switch arm 15' of switch 1' are flexed the full amount of the additional movement of plunger 29'. As shown in FIGS. 3C and 4C of the drawings, the stroke S of plungers 29 and 29' are identical and switch arms 15 and 15' must move through the same distance a to close. However, as may be clearly noted upon studying FIGS. 3C and 4C, switch arm 15 is flexed through the distance a'' while switch arm 15' is flexed through a much greater distance a'''. Thus, switch arm 15 is subjected to appreciably lower bending stress levels than is switch arm 15'. Moreover, since switch arm 15 is flexed relatively little in switch 1 of the present invention and since spring 31 has a substantially lower spring constant K than the second spring constant $Q_2$ of switch arm 15, the centrifugal actuator will encounter appreciably less force in moving to its off position when operating switch 1 of the present invention.

Figure 5:
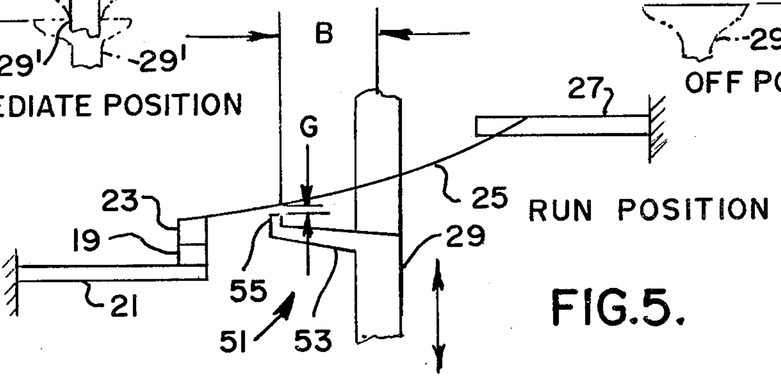
FIG. 5 is an enlarged, semi-diagrammatic view of a portion of the motor starting switch of this invention illustrating the second set of contacts and the manner in which they are opened by the switch operating member with less force than conventional motor starting switches.

Also in accordance with this invention, improved means, as indicated generally at 51, may preferably be provided for opening the normally closed contact set 7. As mentioned above, switch arm 25 is so structured and secured to fixed terminal 27 that it is normally biased toward fixed contact 19 and remains flexed when contact 23 carried thereby engages contact 19 so as to maintain electrical contact between contacts 19 and 23. Means 51 is shown to comprise an arm 53 (see FIG. 5) extending out from plunger 29 and having an upwardly extending finger 55 engageable with bottom face of switch arm 25 intermediate contact 23 and the point where the longitudinal center plane of plunger 29 intersects the switch arm. As indicated by dimension B in FIG. 5, finger 51 is offset from the longitudinal centerline of the plunger toward the free end of switch arm 25, and due to this offset, engages with switch arm 25 adjacent its outer or free end. Thus, plunger 29 has to exert substantially less force on the switch arm to open contacts 19 and 23 than would be the case if plunger 29 engaged the switch at a point on the switch arm in line with the longitudinal centerline of the plunger (i.e., with no offset). This again facilitates easier opening of the contact set 7 of switch 1 and results in a low actuating force switch.

Furthermore, when plunger 29 is in its run position, a gap G may be present between finger 55 and the underside of switch arm 25. This gap allows the plunger to begin to move from its off to its run position before it picks up the load of switch arm 25.

In view of the above, it will be seen that the several objects of the invention are achieved and other advantageous results are attained.

As various changes could be made in the above constructions without departing from the scope of the invention, it is intended that all matter contained in the above description or shown in the accompanying drawings shall be interpreted as illustrative and not in a limiting sense.

What is claimed is:

1. A switch comprising a fixed contact, a cantilevered resilient, flexible switch arm, a movable contact carried by said switch arm, said movable contact together with said switch arm being movable from an open position in which said movable contact is clear of said fixed contact and a closed position in which said contacts are in electrical contact with one another, and a one-piece plunger for moving said switch arm from its open to its closed position, a resilient spring interposed between said switch arm and said plunger, said plunger and said spring being movable in a direction generally toward said fixed contact for closing contacts, said plunger being movable through a stroke greater than the movement of said switch arm required to close said contacts, said spring being engageable with said switch arm for transmitting movement of said plunger to said switch arm, for substantially taking up said portion of said stroke greater than the movement required to close said contacts substantially without subjecting said switch arm to undue bending, but yet for applying a limited amount of additional force on said switch arm thereby to insure good switch contact when said switch is in its closed position.

2. A switch as set forth in claim 1 wherein said switch arm is so structured as to be biased toward its open position, said switch arm having a first spring constant while supported in cantilever position and a second spring constant when cantilevered supported at one end and simply supported on said fixed contact, said spring having a spring constant greater than said first switch arm spring constant and less than said second switch arm spring constant whereby upon movement of said plunger along its path of travel through its stroke, said spring readily effects movement of said switch arm into its closed position and upon engagement of said contacts, further movement of said plunger is substantially taken up by said spring.

3. A switch as set forth in claim 1 wherein said plunger is movable between a first and a second position, and wherein said switch further comprises a second cantilevered resilient, flexible switch arm, a second movable contact carried by said second switch arm, a second fixed contact, said second movable switch arm together with said second movable contact being movable from a closed position in which said second movable contact is in electrical engagement with said second fixed contact and an open position in which said second movable contact is clear of said second fixed contact, said second movable switch arm being in its normally closed position when said plunger is in its first position, said plunger further including a portion engageable with said second switch arm for flexing said second switch arm from its closed to its open position upon movement of said plunger, said plunger portion being spaced from said second movable switch arm when the latter is in its first position so as to insure that said plunger has begun to move from its first to its second position before said plunger portion begins to open said second fixed and movable contacts.

4. Means for limiting stress on a cantilever switch arm, said switch arm being resiliently, flexibly movable between an open position and a closed position in which said switch arm is simply supported at a location distal from its cantilever end, said switch arm being movable from its open to its closed position by a member engageable with the switch arm along a longitudinal axis of the switch arm, said member being movable through a stroke greater than the distance required to move said switch arm from its open to its closed position, a spring interposed between said member and said switch arm, the latter having a first spring constant when supported in cantilever fashion and a second spring constant when supported in cantilever fashion at one end and when simply supported at said distal location, said spring having a spring constant greater than said first switch arm spring constant and less than said second switch arm spring constant whereby upon movement of said member along its path of travel through its stroke said switch arm is caused to move into its closed position and upon further movement of said member through the remainder of its stroke, the additional movement of said member is substantially taken up by said spring.

5. In a motor starting switch comprising a housing, a switch therein for making and breaking a circuit, and a switch plunger operable by a centrifugal actuator or the like and movable relative to the housing through a stroke for closing said switch, said switch including a flexible, resilient switch arm of suitable electrical conductive material cantilever supported at one end by said housing, a fixed contact supported by said housing, and a movable contact carried by said switch arm for making and breaking contact with said fixed contact, said switch arm being flexibly bendable from an open position in which said contacts are clear of one another to a closed position in which said contacts are in electrical contact, said stroke of said plunger being greater than the distance said switch arm must be flexed so as to effect closing of said switch, wherein the improvement comprises a spring interposed between said plunger and said switch arm for transmitting movement of said plunger to said switch arm for closing said switch and for substantially taking up the remainder of said stroke of said plunger after said switch has closed, but yet for applying a limited amount of additional force on said switch arm thereby to insure good switch contact when said switch is in its closed position.

6. In a motor starting switch comprising a housing, a flexible, resilient switch arm cantilevered in the housing, a fixed contact supported by the housing, a movable contact carried by said switch arm for making a breaking contact with said fixed contact, said switch arm being movable from an open position in which said contacts are clear of one another and a closed position in which said contacts are in engagement with one another so as to complete a circuit, a switch plunger movable along a path relative to said housing through a stroke during each cycle of the switch for closing and opening said contacts, the stroke of said plunger being greater than is required to close said contacts, wherein the improvement comprises: spring means interposed between said plunger and said switch arm for effecting movement of the latter from its open to its closed position upon movement of said plunger through at least a portion of its stroke, said switch having a first stiffness coefficient as it moves from its open to its closed position and a second stiffness coefficient as it undergoes additional loading exerted thereon by said spring means after said contacts have closed and while said plunger travels through the remainder of its stroke, said spring means having a predetermined spring constant, said switch arm being less stiff than said spring means as it is flexed from its open to its closed position and being stiffer than said spring means as it is further loaded by said spring means after said contacts have closed whereby the majority of the remainder of the stroke of said plunger is taken up by deflection of said spring means and the minority of the remainder of the stroke of said plunger is taken up by the deflection of said switch arm to provide increased pressure between said contacts when said switch is closed.

7. A switch comprising a housing, a first fixed contact, a first resilient switch arm, a first movable contact carried by said first switch arm between an open position in which said first fixed contact and said first movable contact are clear of one another and a closed position in which said first fixed contact and said first movable contact are in electrical contact with one another, said first switch contacts being normally open, a second fixed contact, a second resilient switch arm, a second movable contact carried by said second switch arm between an open position in which said second fixed contact and said second movable contact are clear of one another and a closed position in which said second fixed and movable contacts are in electrical contact with one another, said second switch contacts being normally closed, a one-piece plunger movable relative to said housing between a first position and a second position, said plunger being engageable with said first and second switch arms as said plunger moves from its first to its second position for opening said second switch and for closing said first switch, said plunger being further operable with said first and second switch arms so as to open said first switch into closed said second switch as said plunger moves from its second to its first position, spring means interposed between said first switch arm and said plunger and being engageable with said first switch arm as said plunger moves between its first and second positions, said plunger being clear of said second switch arm when said plunger is in its first position and being engageable with said second switch arm as said plunger moves from its first position toward its second position after said plunger and said spring means have begun to move said first switch arm toward its closed position.

* * * * *

UNITED STATES PATENT AND TRADEMARK OFFICE

CERTIFICATE OF CORRECTION

PATENT NO. : 4,284,864

DATED : August 18, 1981

INVENTOR(S) : William D. Crow et al.

It is certified that error appears in the above—identified patent and that said Letters Patent is hereby corrected as shown below:

Column 5, line 49, "1" should read --ℓ--.

Column 6, line 35, "swith" should read -- switch --.

Signed and Sealed this

*Thirteenth* Day of *April 1982*

|SEAL|

*Attest:*

GERALD J. MOSSINGHOFF

*Attesting Officer* *Commissioner of Patents and Trademarks*